United States Patent
Zhao

(10) Patent No.: US 8,478,293 B2
(45) Date of Patent: Jul. 2, 2013

(54) MOBILE STATION PAGING METHOD AND MOBILE CALL CENTER DEVICE

(75) Inventor: Hongxia Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/337,838

(22) Filed: Dec. 27, 2011

(65) Prior Publication Data

US 2012/0100871 A1    Apr. 26, 2012

Related U.S. Application Data

(63) Continuation of application No. PCT/CN2010/073969, filed on Jun. 13, 2010.

(30) Foreign Application Priority Data

Jun. 29, 2009   (CN) .......................... 2009 1 0151038

(51) Int. Cl.
*H04W 24/00* (2009.01)

(52) U.S. Cl.
USPC .......................... 455/456.1; 455/445; 455/458

(58) Field of Classification Search
USPC .............. 455/405–408, 422.1, 428, 435, 445, 455/456, 458; 370/328–338
See application file for complete search history.

(56) References Cited

U.S. PATENT DOCUMENTS

| 5,737,702 | A | 4/1998 | Madhavapeddy et al. |
| 5,842,127 | A | 11/1998 | Pashtan et al. |
| 5,875,400 | A | 2/1999 | Madhavapeddy et al. |
| 5,953,667 | A | 9/1999 | Kauppi |
| 5,960,356 | A | 9/1999 | Alperovich et al. |
| 6,181,945 | B1 * | 1/2001 | Lee ................................ 455/445 |
| 6,947,490 | B1 | 9/2005 | Edwards et al. |
| 7,072,674 | B1 | 7/2006 | Mademann |
| 7,194,276 | B2 | 3/2007 | Bejerano et al. |
| 7,489,936 | B1 * | 2/2009 | Liu ............................ 455/456.1 |

FOREIGN PATENT DOCUMENTS

| CN | 1100465 C | 1/2003 |
| CN | 101321308 A | 12/2008 |
| CN | 101350935 A | 1/2009 |

OTHER PUBLICATIONS

First Chinese Office Action of Chinese Application No. 200910151038.8 mailed Jun. 7, 2012, 8 pages.
Second Chinese Office Action of Chinese Application No. 200910151038.8 mailed Sep. 7, 2012, 7 pages.

(Continued)

*Primary Examiner* — Kashif Siddiqui
(74) *Attorney, Agent, or Firm* — Slater & Matsil, L.L.P.

(57) ABSTRACT

Embodiments of the present invention provide a mobile station paging method and a mobile call center device, The method includes: receiving a service call request, and selecting a corresponding posterior probability table according to an identifier of a target mobile station included in the service call request, where the posterior probability table includes a distribution probability of the target mobile station in each cell of a location area where the target mobile station is located in a service state; and selecting a cell to page the target mobile station according to the distribution probability. The paging is performed based on the distribution probability of a user in the each cell in the service state; the paging process is simple; and the application scenario is wide, thereby saving air interface resources while ensuring a paging efficiency.

11 Claims, 2 Drawing Sheets

OTHER PUBLICATIONS

Bhattacharya, Amiya, et al., "LeZi-Update: An Information-Theoretic Framework for Personal Mobility Tracking in PCS Networks," Wireless Networks 8, 2002, pp. 121-135.

Cayirci, Erdal, et al., "User Mobility Pattern Scheme for Location Update and Paging in Wireless Systems," IEEE Transactions on Mobile Computing, vol. 1, No. 3, Jul.-Sep. 2002, pp. 236-247.

Lee, Jong-Min, et al., "Call Arrival History-Based Strategy: Adaptive Location Tracking in Personal Communication Networks," IEICE Trans. Commun., vol. E83-B, No. 10, Oct. 2000, pp. 2376-2385.

Ericsson, "Improvement of Alternative 1 and 2," 3GPP TSG SA WG2 Meeting #63, TS S2-081280, Athens, Greece, Feb. 18-22, 2008, 6 pages.

European Search Report received in European Application No. 10793556.1-1249, Dated May 25, 2005, 7 pages.

International Search Report and Translation received in Patent Cooperation Treaty Application No. PCT/CN2010/073969, Dated Sep. 23, 2010, 10 pages.

Mao, Zuji, "An Intra-LA Location Update Strategy for Reducing Paging Cost," IEEE Communications Letters, vol. 6, No. 8, Aug. 2002, pp. 334-336.

Pollini, Gregory P., et al., "A Profile-Based Location Strategy and Its Performance," IEEE Journal on Selected Areas in Communications, vol. 15, No. 8, Oct. 1997, pp. 1415-1424.

Written Opinion of the International Searching Authority and Translation received in Patent Cooperation Treaty Application No. PCT/CN2010/073969, Dated Sep. 23, 2010, 8 pages.

Reject Decision of Chinese Application No. 200910151038.8 mailed Dec. 10, 2012, 10 pages. (Partial Translation).

Third Office Action of Chinese Application No. 200910151038.8 mailed Apr. 19, 2013, 9 pages. (Partial Translation).

\* cited by examiner

MOBILE STATION PAGING METHOD AND MOBILE CALL CENTER DEVICE

This application is a continuation of International Application No. PCT/CN2010/073969, filed on Jun. 13, 2010, which claims priority to Chinese Patent Application No. 200910151038.8, filed on Jun. 29, 2009, both of which are hereby incorporated by reference in their entireties.

TECHNICAL FIELD

The present invention relates to the field of wireless communications technologies, and in particular, to a mobile station (MS) paging method and a mobile call center device.

BACKGROUND

A modern public land mobile network is on the basis of cellular architecture, and the cellular implements mobile communication for a user. In such architecture, location management is a core technology, and includes two parts as follows: location tracking for an idle mode MS, and a switching technology for ensuring service continuity after location change in a transmission mode. In a current mainstream cellular communication system such as a 2G or 3G system, a two-level location management method is generally used. The first layer of the location management is a cell, and the second layer is a Location Area (LA) which is a basis of the location tracking. Each LA is formed by many cells. A MS checks whether the LA where the MS is located is changed. If the LA is changed, the MS actively reports new location information to a network. When a call is initiated, the network pages in all the cells covered by the LA reported by the MS in the last time.

In the implementation of the present invention, the prior art at least has the following disadvantages. In an existing tracking method based on a static location, when a MS enters a new LA, the MS may perform location update; and when the MS moves among the cells in the LA, the MS may not report new location information thereof. Therefore, the network merely knows which LA the MS is located in currently, but does not know which cell covers the MS. In order to page the MS, in a conventional technology, it is required to deliver the paging in the whole LA, so an overhead of the air interface resources for the paging is great. In another conventional technology, a management method of a dynamic LA is used for optimizing a single MS. The terminal tracks a moving trace of the user all the time. No matter whether the MS is in an idle state or in a service state currently, once finding that the user trace is changed, the MS reports the change to the network, and then the network optimizes the LA, and further optimizes a paging area by optimizing the LA, thereby causing complexity of network implementation and management. Moreover, since the MS is required to frequently report the moving trace of the user, air interface resources are still severely wasted.

SUMMARY OF THE INVENTION

Embodiments of the present invention provide a MS paging method and a mobile call center device, so as to solve problems of complex network implementation and severe waste of air interface resources in the prior art, and reduce complexity of the network implementation, and save the air interface resources.

An embodiment of the present invention provides a MS paging method, which include receiving a service call request, and selecting a corresponding posterior probability table according to an identifier of a target MS included in the service call request, where the posterior probability table includes a distribution probability of the target MS in each cell of a LA where the target MS is located in a service state, and selecting a cell to page the target MS according to the distribution probability.

An embodiment of the present invention provides a mobile call center device, which include a first processing module, configured to receive a service call request, and select a corresponding posterior probability table according to an identifier of a target MS included in the service call request, where the posterior probability table includes a distribution probability of the target MS in each cell of a LA where the target MS is located in a service state, and a paging module, configured to select a cell to page the target MS according to the distribution probability.

Through the MS paging method and the mobile call center device provided in the embodiments of the present invention, the paging is performed based on the distribution probabilities of the user in the cells in the service state; the paging process is simpler and more flexible; and the application scenario is wider, thereby saving the air interface resources while ensuring the paging efficiency.

DETAILED DESCRIPTION OF THE EMBODIMENTS

Figures 1, 2:
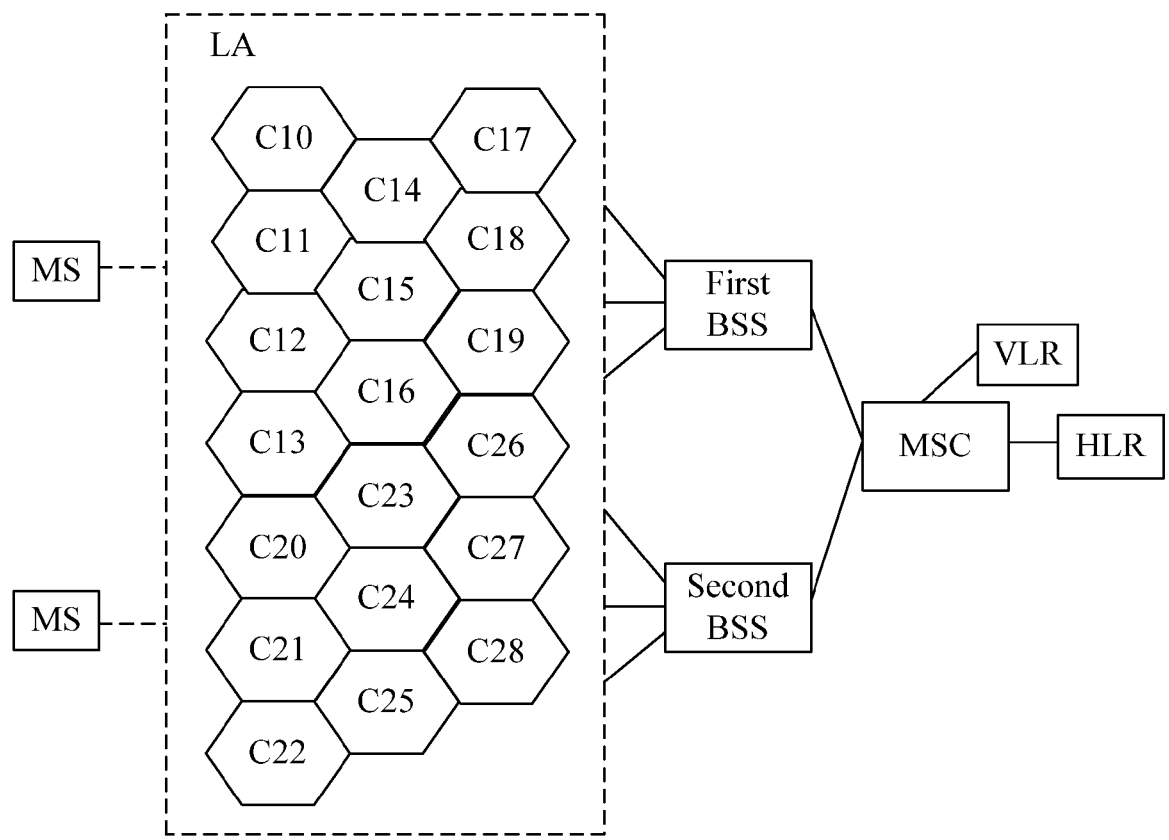
FIG. 1 is a flow chart of a MS paging method according to an embodiment of the present invention.
FIG. 2 is a schematic composition diagram of a network system using a MS paging method according to an embodiment of the present invention.

The technical solutions of the present invention are further described with reference to the accompanying drawings and the specific embodiments.

In the embodiment of the present invention, it can be known by analyzing a location management objective of a current cellular network that the objective of the location management is not to know where and when a MS is located, but to fast and correctly page the MS when a call is initiated, so that the MS does not miss a service. Therefore, the embodiments of the present invention provide a solution for the similar objective with the location management, that is, distribution probabilities of the services of the MS in the cells are dynamically obtained, and the paging is optimized on the basis of the distribution probabilities. Such a manner is simpler than the manner of tracking a moving trace of a user, thereby saving air interface resources while ensuring the paging efficiency. Moreover, the manner is more flexible and has a wider application scenario.

An embodiment of the present invention provides a MS paging method, which includes: receiving a service call request; and selecting a corresponding posterior probability table according to an identifier of a target MS included in the service call request, where the posterior probability table includes distribution probabilities of the target MS in cells of a location station where the target MS is located in a service state; and then selecting a cell to page the target MS according to the distribution probability.

Specifically, when a mobile call center receives the service call request including the identifier of the target MS, the mobile call center searches the posterior probability table corresponding to the target MS according to the identifier, and then pages the target MS. During the paging, specifically, the cell with the high distribution probability is preferably selected for paging in a descending order of the distribution probabilities, that is, the paging is performed in a descending order of the distribution probabilities.

In this embodiment, the posterior probability table includes the distribution probabilities of the target MS in each cell of the LA where the target MS is located, that is, the posterior probability table includes the distribution probabilities of the MS in all the cells of the LA. The distribution probability of a cell is zero if the target MS never reaches the cell. In the embodiments of the present invention, the cells in the posterior probability table refer to all the cells in the LA where the MS located in.

In this embodiment, the cells in the posterior probability table may be classified into several paging sets, and the paging is performed with the paging set as a unit. When the cells in the posterior probability table are classified into one paging set, the paging is performed for all the cells in the posterior probability table; and when each cell in the posterior probability table is classified into one paging set, one cell is paged each time. Definitely, the cells in the posterior probability table may also be classified into several paging sets with different priorities for paging, and the cell with the high distribution probability is preferably classified into the paging set with the high priority. During the paging, the paging is sequentially performed in the cells included by the paging set in a descending order of the priorities of the paging sets, and in this embodiment, the posterior probability table may be merely a table, where the distribution probabilities of the target MS in the cells at all time in the service state are recorded. Definitely, a plurality of posterior probability tables may also be established according to time segments, and each posterior probability table reflects the distribution probabilities in a time segment. In this way, the paging may be enabled to be more correct. The present invention is described in further detail in the following through an example of maintaining a plurality of posterior probability tables corresponding to different time segments.

FIG. 1 is a flow chart of a MS paging method according to an embodiment of the present invention, and as shown in FIG. 1, the method includes the following steps.

Step 100: Receive a service call request, and select a corresponding posterior probability table according to an identifier of a target MS included in the service call request and a time of receiving the service call request, where the posterior probability table includes distribution probabilities of the target MS in each cell of LA where the target MS is located in a service state.

The posterior probability table described in this embodiment refers to a posterior probability table including distribution probabilities of a MS in each cell of a LA where the MS is located in a service state, capable of being called by the mobile call center, and maintained by the mobile call center or other network elements. Specifically, it is assumed that Bi represents an event that a user appears in a cell Ci; A represents an event that the user is in a service state; P(Bi) represents a probability that the user appears in the cell Ci; and P(Bi|A) represents a distribution probability of the user in the cell Ci in the service state, which is also referred to as posterior probability. In an existing method, the distribution information, such as P(Bi), of the user in each cell is mainly obtained on the basis of the history information of the user, and then the paging is performed on the basis of the distribution information. However, in the embodiments of the present invention, the posterior probabilities P(Bi|A) of the user in the cells are obtained on the basis of the relevant information of the user in the cells in the service state, and then the paging is performed in the cell with a relatively high P(Bi|A) on the basis of a criterion of the highest posterior probability in the case of considering a service delay request, so as to optimize the paging. During the period of service establishment between the MS and the network, the network makes statistics of the information in the cell accessed by the MS in the service state. After making statistics for a period of time, the distribution probabilities P(Bi|A) of the MS in different cells of the LA in the service state are formed according to the statistical information.

In addition, the posterior probability table is related to the time segment, and different time segments correspond to different posterior probability tables. During paging optimization, it is required to first determine to use a posterior probability table corresponding to which time segment, and then the paging is optimized according to the posterior probabilities of the MS in the cells, so as to improve the paging efficiency. After the mobile call center receives the service call request, it is first determined to which time segment the time of receiving the service call request belongs, and the posterior probability table corresponding to the identifier of the target MS carried in the service call request is selected according to the time segment.

Step 101: Classify each cell in the posterior probability table into one of a plurality of paging sets with the same number as the maximum paging times, where the paging set is obtained according to a descending order, and the maximum paging times is obtained according to the maximum allowable call delay of the service call request and each paging time.

After the posterior probability table to be used is determined, since the posterior probability table includes the posterior probability information of many cells, that is to say, the paging scope of the mobile call center at this time covers all the cells in the posterior probability table. Moreover, since the each cell corresponds to a different posterior probability, if the paging efficiency needs to be improved, within the allowable paging delay, the paging may be first performed in several cells with a relatively high posterior probability, and the paging success ratio is relatively high due to the high posterior probability. Therefore, the mobile call center sorts the distribution probabilities of the cells in a descending order of the distribution probabilities, and then classifies the cells in the posterior probability table into several paging sets with the same number of the maximum paging times, that is, several cells with the high distribution probabilities are preferably classified into a paging set; several cells with medium distribution probabilities are classified into other several paging sets; and several cells with the lowest distribution probabilities are classified into another paging set. In this way, all the cells in the LA are all sequentially classified into a plurality of paging sets with different priorities according to the corresponding distribution probabilities. In this embodiment, the number of the established paging sets may be the same as the maximum paging times, and the maximum paging times is obtained according to the maximum allowable call delay time of the service call request and each paging time, and is specifically obtained by dividing the call delay by each paging time.

Step 102: Page the target MS according to a descending order of the distribution probabilities with the paging set as a unit.

The mobile call center classified each cell into one of several paging sets with the same number as the maximum paging times, and the paging may be separately performed within the maximum allowable call delay. All the cells in one paging set are paged each time, and since the paging set has a priority, the mobile call center may select the corresponding paging set for paging in a descending order of the priorities. Specifically, the paging set with a high distribution probability and a high priority may be paged first. If the paging is successful, the paging is stopped; if the paging fails, the paging set with the medium distribution probability is paged; and finally the paging set with the low distribution probability is paged. In this way, not only it is ensured to successfully page within the maximum allowable call delay as much as possible, but also the air interface resources are saved and the paging efficiency is not reduced. Definitely, if the maximum allowable call delay of a service is relatively long, for example, a message service, the paging may be performed in several times. If the maximum allowable call delay of a service is too short, for example, an emergence call, all the cells may be included into one paging set, and the mobile call center merely pages once, that is, pages all the cells in the posterior probability table.

When a new service is reached, the mobile call center calculates the maximum paging times according to delay requirements of the current service, and decides to page once or several times according to the distribution probabilities of the MS located in the cells in the service state and the allowable maximum paging times of the current service, and selects one or more cells with the maximum distribution probability in the cells of the MS in the service state to perform the paging until the paging is successful.

Through the MS paging method provided in this embodiment, the paging is performed on the basis of the distribution probabilities of the user in the cells in the service state. In this way, the paging process is simpler and more flexible, and the application scenario is wider, thereby saving the air interface resources while ensuring the paging efficiency.

The method for dynamically obtaining the distribution probabilities of the MS in the cells in the service state is described in the following.

After the MS establishes the service connection with the network, the network may know the relevant information of the MS in the service state currently, and may collect all the cell information of the service and the information such as the duration of the service in the cells accordingly. In addition, the network may also relatively easily collect the information such as a moving speed of the MS in the cells during the service period. Since the collection, storage, and processing of the information all require certain cost, after considering the cost and practicality, in this embodiment, the following method is used to make statistics of the distribution information of the MS in the cells in the service state. A specific process may be as follows: A network side first makes statistics of distribution information of a target MS in the cells in the service state in one period, and then obtains distribution probabilities of the target MS in the cells of a LA where the MS is located in the service state according to a sum of the distribution information of each cell corresponding to the MS and the distribution information corresponding to all the cells in the LA. The distribution information may include the times of responding calls by the target MS in the cells, the times of initiating calls and responding calls, or a service duration, and the three conditions are respectively introduced in the following.

One method is to merely make statistics of the times of responding the calls by the MS in the cells. Since an objective of obtaining the distribution probabilities of the MS in the cells is to page the MS and establish service connection when a next called service is reached, making statistics on the basis of responses of the MS for the service is a relatively reasonable and simple method.

$P(Bi|A)$=the called times of the MS in a cell $Ci$ in the statistical time divided by the overall called times of the MS in all the cells in the statistical time.

Another method is to make statistics of the times of initiating calls by the MS in the cells, and the times of responding calls. Statistically, the cell where the calling services frequently occur is also a cell where the called services frequently occur, and therefore, in order to increase the number of samples, both the calling times and the called times may be made statistics of, and the distribution probabilities of the MS in the cells are calculated on the basis of a sum of the calling times and the called times. The calculation method is as follows:

$P(Bi|A)$=the call times of the MS in the cell $Ci$ in the statistical time divided by the overall call times of the MS in all the cells in the statistical time, where, the call times=the calling times+the called times.

Yet another method is to make statistics of the duration of the services in the cells, and the distribution probabilities of the MS in the cells in the service state are calculated according to the duration.

$P(Bi|A)$=the overall service duration of the MS in the cell $Ci$ in the statistical time divided by the overall service duration of the MS in all the cells in the statistical time.

After the network side such as the mobile call center obtains the required distribution probability, a posterior probability table may be established according to identifiers of the cells and the corresponding distribution probabilities. That is to say, the posterior probability table includes the identifiers of the cells and the corresponding distribution probabilities, and may also include the specific numeric value such as the service duration in the corresponding cell. In the embodiment of the present invention, the method for data storage and processing in the network is further described on the basis of the third method.

The distribution probabilities of the MS in the cells in the service state are analyzed according to a statistical period. The statistical period is a key of obtaining a stable posterior probability $P(Bi|A)$. Since the service action and moving action of people are non-repetitive and not fully random, but has statistical periodicity, the reasonable selection of the statistical period is a key of stably obtaining the posterior probability in time. Although different statistical periods may be used, several important periods exist in people's life, such as day, week. The life of most people is periodically repeated in days and weeks. Different people have different key time segments in a day, but days and nights are two key time segments for most people. In a week, although different people have different life and moving manners, workdays and weekends are two important time segments for most people. Based on the above analysis, after considering the simplicity and practicality, the following method is used in this embodiment to calculate the statistical period.

In this embodiment, the statistical period is set to one week, and considering the features of life manners of most people in different time segments of different days in one week, the statistics is separately made for different time segments in a period, and the time segments are classified as in Table 1.

TABLE 1

| Statistical period | Kinds of days | Segmentation of different time segments in a day | Serial numbers of the statistical segments Ts |
|---|---|---|---|
| A week | Workday | Day | 1 |
|  |  | Night | 2 |
|  | Rest day | Day | 3 |
|  |  | Night | 4 |

In one statistical period, after the MS establishes a connection with the network, the network judges the statistical time segment to be selected, and then makes statistics of the service duration of the MS in the accessed cell in the statistical time segment. For example, if the current service occurs at 10 a.m. during a workday, the network selects the statistical time segment Ts=1. When the current service of the MS crosses the time segment, statistics may be separately made.

When the statistical period is over, the network processes the statistical data, and calculates the posterior probabilities of the MS located in the cells in different time segments. The network divides the statistical period into at least one time segment, and establishes the posterior probability table corresponding to the time segment. For example, Table 2 is a table corresponding to the case when the statistical period Ts=1, and the distribution probabilities are sorted in a descending order thereof.

TABLE 2

| Cell internal index Ci | Cell identifier | Service duration (s) | Posterior probability P(Bi|A) of the MS located in the cells |
|---|---|---|---|
| 1 | Cell6 | 300 | 0.517 |
| 2 | Cell1 | 200 | 0.345 |
| 3 | Cell2 | 50 | 0.086 |
| 4 | Cell5 | 20 | 0.035 |
| 5 | Cell4 | 10 | 0.017 |

When the MS enters a LA for the first time, and does not experience a complete statistical period to obtain stable posterior probability information, the required probability may still be calculated on the basis of the existing statistical information at this time, and the paging is performed on the basis of the probability information. The difference lies in that, the samples are few at this time and the deviation of the statistical probability is relatively high.

After the posterior probability P(Bi|A) of the MS located in the cell is obtained, the network successively pages in one or more cells with the maximum P(Bi|A) in the case of considering the service delay requirement. A specific description is as follows: It is assumed that, N represents the total number of the cells included in the LA; an overhead of the air interface resources during paging once in one cell is $C_p$; a sum of the air interface paging overheads of all the cells where the paging is performed by the network in the LA is $C_{total}$; the maximum consumed time of paging once is $T_p$; the maximum allowable paging delay of the service is $T_{max}$; and the maximum allowable paging times is K.

When paging is required, the network calculates the maximum allowable paging times K according to the following formula according to the time requirement of the current service: $K=T_{max}/T_p$.

Then, the network determines the time segment according to Table 1 and the initiation time of the current service, and selects the corresponding posterior probability table for different time segments as a basis for further selection of cells. For example, when the time corresponding to the current call is 10 a.m. during a workday, the network selects the table where Ts=1, which is shown in Table 2.

The network uses the currently allowable maximum paging times K as a constraint to classify all the cells in the LA into K sets, and the K sets are indicated as follows: $S_1=\{C_{11}, \ldots C_{1i}\}$, $S_2=\{C_{21}, \ldots C_{2j}\}$, $S_K=\{C_{K1}, \ldots C_{Km}\}$. The network first places i cells with the maximum posterior probability in the table into a set $S_1$ in a descending order of the posterior probabilities, and then selects j cells with the maximum posterior probability in the residual cells in the LA, and places the j cells into a set $S_2$. After K−1 sets are formed, the network classifies the finally residual cells in the LA into a set $S_K$.

The sets are sorted as follows in a descending order of the priorities of the paging by the network: $S_1, S_2 \ldots S_K$. The network first pages in the set $S_1$. If the MS responds to the paging, the network stops paging. If the MS does not respond, the network sequentially pages from the set $S_2$ to the set $S_K$, and stops paging if a paging response is received during the process.

In the above description, in the case of fixed maximum paging times K, all the cells in the LA are classified into K paging sets according to the posterior probabilities P(Bi|A). The cell with the high posterior probability is first classified into the paging set with the high priority, and the network successively pages in the sets in a descending order of the priorities of the paging sets until the MS responds. As for how many cells should be classified into each set, the above paging set classifying method is further analyzed in the following. Many classifying methods exist, and two methods are provided in this embodiment in the following, which definitely are not limited thereto.

One classifying method is to evenly classify the cells in the posterior probability table into several paging sets with the same number as the maximum paging times, that is, the cells are classified into equal parts according to the number of the cells, which is the simplest method. The number of the cells $N_c$ included in each set is obtained through the following formula:

$$N_{sc} = \frac{N}{K},$$

and therefore the network places $N_{sc}$ cells with the maximum P(Bi|A) into the set $S_1$, and then places the subsequent $N_{sc}$ cells into the set $S_2$ until all the cells are placed into K paging sets.

Another classifying method is to classify the cells in the posterior probability table into several paging sets with the same number as the maximum paging times according to a preset rule, where the preset rule includes: selecting a paging set including the minimum number of the cells, so that $P_1 > P_{t1}$, $P_2 > P_{t2}, \ldots, P_K > P_{tK}$, where $P_k$ represents a sum of the distribution probabilities corresponding to the cells included in the first paging set to the kth paging set in the K paging sets; $P_{tk}$ represents a paging success probability threshold in a kth time; k and K are positive integers; 0<k≦K, and K represents the maximum paging times.

In the above method, the cells are classified into K sets according to the set cumulative paging success probability threshold at each time. Specifically, the network gives the paging success probability threshold $P_{tk}$ according to a principle of minimizing the air interface resource overhead, and $P_{t1} < P_{t2} < \ldots P_{tk} \ldots < P_{tK}$. It is assumed that, the number of the cells included in the sets is $n_1, n_2 \ldots n_k \ldots n_K$; the posterior probabilities $P(B_i|A)$ are sorted in a descending order; $P(B_1|A)$ represents the maximum posterior probability, that is, $P(B_1|A) > P(B_2|A) > \ldots P(B_i|A) \ldots > P(B_N|A)$; and $P_k$ represents the sum of the posterior probabilities of all the cells in the k sets $S_1, S_2, \ldots S_k$. Therefore, $$P_k = P_{k-1} + \sum_{j=n_{k-1}}^{n_k} P(B_j \mid A),$$

and $P_k > P_{tk}$ is required to be met, that is, the sum of the posterior probabilities of all the cells in the previous k paging sets should be greater than the threshold of the kth set $P_{tk}$.

Therefore, the paging overhead of the network in one service may be described through the following formula:

$$C_{total} = C_p(n_1 + n_2(1-P_1) + n_3(1-P_2) + \ldots + n_K(1-P_{K-1}))$$

$$= C_p\left(N - \sum_{k=1}^{K-1} n_{k+1} P_k\right)$$

It can be seen from the above formula that, if the threshold $P_{tk}$ is given, the greater $n_{k+1}$ is, the better the condition is. That is, in the case of a given threshold, when the kth paging set is formed, the selected number of cells is the number of cells when $P_k$ is minimum in the case of the threshold requirement $P_k > P_{tk}$, and as many as possible cells are reserved to the (k+1)th set. Therefore, the number of the cells in the kth set should meet the following formula:

$$n_k = \text{Arg}\left\{\underset{n_k}{\text{MIN}}\left(\left(P_{k-1} + \sum_{j=n_{k-1}}^{n_k} P(B_j \mid A)\right) > P_{tk}\right)\right\}.$$

That is, when the network classifies the paging sets, the network places $C_j$ into the current set in a descending order of $P(B_j|A)$ until the sum $$\sum_{j=n_{k-1}}^{n_k} P(B_j \mid A)$$

of the cell probabilities placed into the current set $S_k$ plus the sum $$P_k = P_{k-1} + \sum_{j=n_{k-1}}^{n_k} P(B_j \mid A)$$

of the posterior probabilities in all the cells in the $S_1, S_2 \ldots S_{k-1}$ sets are greater than $P_{tk}$. For example, if the maximum allowable paging times is 2, on the basis of the data in Table 2, it is assumed that the paging success probability threshold $P_{t1} = 0.6$, so when the first paging set $S_1$ is formed, since the sum of the probabilities in the first two cells is equal to 0.862 to be greater than the paging success probability threshold, the cells with the cell indexes C1 and C2 are selected and placed into the set $S_1$ as the cell set in the first paging, and if no response occurs, the paging is performed in the residual cells of the LA.

The above embodiment introduces a paging method on the basis of the distribution probabilities of the MS in the cells in the service state, and introduces the content such as how to make statistics of the distribution probabilities and the classifying principle of the paging sets. A detailed implementation process of the MS paging method according to the embodiment of the present invention is described in the following through a specific embodiment with reference to FIG. 2. FIG. 2 is a schematic composition diagram of a network system using a MS paging method according to an embodiment of the present invention. FIG. 2 shows an embodiment of a current cellular system such as a Global System for Mobile Communication (GSM) system. As shown in FIG. 2, cells included in a LA are respectively managed by two access network devices: a first Base Station Sub-system (BSS) and a second BSS. In this embodiment, the first BSS and the second BSS are both connected to a same Mobile Switching Center (MSC). Therefore, the MSC is responsible for managing mobility of a MS in the LA. That is, when the MS enters the LA, the MSC is required to report location information, and then selects to store the location information into a Visiting Location Register (VLR) or a Home Location Register (HLR) according to a location information storage principle. In addition, when other MSs call the MS, the MSC uses a certain paging policy to page in the LA managed by the MSC according to the location information stored in the VLR and the HLR. The method provided in the embodiment of the present invention is described as follows.

1. The Network Obtains Posterior Probabilities P(Bi|A) of the MS in the Cells in the LA and the Relevant Stored Information.

(1) When a MS enters a LA for the first time, the MSC cannot obtain the posterior probabilities P(Bi|A) of the MS in the cells in the LA. Therefore, if the MSC needs to page the MS at this time, the MSC may directly deliver a paging message in all the cells of the whole LA.

(2) When the MS has a service in a cell C13, a wireless access connection is established between the MS and the first BSS, so the first BSS knows that the current MS service occurs in the cell C13, and also knows the duration t13 of the current service of the MS in the C13. Since the connection between the first BSS and the MSC is also established during the service period, the first BSS easily reports the relevant information to the MSC.

(3) When the MS is switched from C13 to C21, the connection between the first BSS and the second BSS is required to be established. The first BSS may report the recorded t13 information to the MSC through the connection between the first BSS and the MSC, or the first BSS sends the t13 information to the second BSS through an interface between the first BSS and the second BSS, and the second BSS temporarily stores the t13 information. After the current session of the MS ends in C21, the second BSS sends the locally recorded t21 (the service duration of the MS in the cell C21) and t13 together to the MSC through the interface between the second BSS and the MSC.

(4) The MSC makes statistics of the session duration of the MS in each cell of the LA in each service to form a plurality of posterior probability tables. In this embodiment, one of the tables such as Table 3 is taken as an example for description. Table 3 is obtained through the statistics of the time segments from Monday to Friday, that is, Ts=1. The MSC may store the information in Table 3 into the VLR and the HLR.

TABLE 3

| Cell internal index Ci | Cell identifier | Service duration (s) | Posterior probability P(Bi|A) of the MS located in the cells |
|---|---|---|---|
| 1 | C17 | 1500 | 0.385 |
| 2 | C23 | 1000 | 0.256 |
| 3 | C16 | 500 | 0.128 |
| 4 | C18 | 500 | 0.128 |
| 5 | C21 | 300 | 0.077 |
| 6 | C22 | 100 | 0.026 |

When the MS moves from the MSC to other LA managed by another MSC, the HLR may deliver a message to inform the MSC, and at this time, the MSC may select to store the posterior probability table such as Table 3 of the MS in the LA into the VLR or the HLR where the MS belongs before. Since the information storage capability of the VLR or the HLR is always limited, the VLR or the HLR may set an aging time for the MS in the posterior probability table of different LAs, and if the records are not accessed when the aging time is reached, the records may be deleted.

2. The Network Pages by Using a Location Distribution Table.

Figure 3:
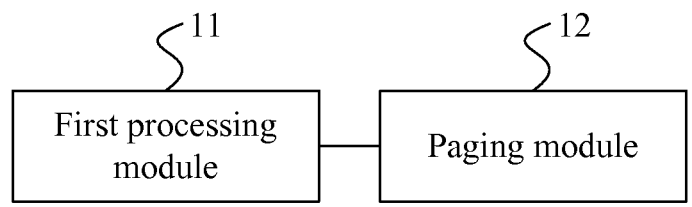
FIG. 3 is a schematic structure diagram of a mobile call center device according to an embodiment of the present invention.

(1) When the MS is in the LA, and another MS calls the MS during Ts=1, the MSC first queries the posterior probability table corresponding to the MS as shown in FIG. 3 from the VLR or the HLR when receiving a call establishment message, and the query may be performed according to an MS identifier such as a mobile phone number or an international mobile subscriber identity (IMSI) and the like.

(2) After the MSC checks the maximum allowable duration of the current call service, the MSC calculates that the service can be paged twice at most. In addition, it is set in the MSC that, the thresholds of the two times of paging are respectively 80% and 100%. Therefore, the MSC classifies all the cells in the LA into two sets; the first set includes C17, C23, C16 and C18; and the second set includes the residual cells in the LA. The MSC first pages in the first set. If the MS responds to the paging, the MSC stops paging; and if the MS does not respond to the paging, the MSC pages in the second set.

In addition, in the above step, when the MSC pages in different cells, it is required to first deliver the paging message to the corresponding BSS, and then the BSS delivers the page message in the cells. Since the cell identifier in the existing network occupies many bytes, when the MSC instructs the BSS to deliver the paging message in many cells, it is required to carry many cell identifiers in the interface between the MSC and the BSS. In order to save the transmission bandwidth, a bit may be allocated for different cells between the MSC and the BSS, and a mapping view is used to indicate whether it is required to deliver the paging message in the corresponding cell. For example, in this embodiment, the first BSS has 10 cells, 10 bits may be used to instruct whether the paging message need to be delivered in the 10 cells, and therefore, 2 bytes may be used for indication. The cells C10 to C19 are identified in an ascending order. The location with no cell is indicated by 0, as shown in Table 4.

Therefore, when the MSC instructs the first BSS1 to deliver the paging in C17, C16 and C18, the MSC may set the corresponding sixth, seventh, and eighth locations in Tables 4 to 1, and set the other locations to 0, which is expressed into 01C0H in hexadecimal. The case of instructing the second BSS is not described in detail here again.

Through the MS paging method provided in the embodiments of the present invention, the paging is performed on the basis of the distribution probabilities of the user in the cells in the service state. In this way, the paging process is simpler and more flexible, and the application scenario is wider, thereby saving the air interface resources while ensuring the paging efficiency.

Those of ordinary skill in the art may understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk and the like.

FIG. 3 is a schematic structure diagram of a mobile call center according to an embodiment of the present invention. As shown in FIG. 3, the mobile call center device includes a first processing module 11 and a paging module 12. The first processing module 11 is configured to receive a service call request, and select a corresponding posterior probability table according to an identifier of a target MS included in the service call request, where the posterior probability table includes distribution probabilities of the target MS in cells of a LA where the target MS is located in a service state. The paging module 12 is configured to select a cell to page the target MS according to the distribution probability.

The mobile call center device provided in this embodiment may be an MSC, and the MSC is taken as an example in this embodiment for description. After receiving a new service call request, the first processing module 11 in the MSC obtains an identifier of the target MS from the service call request, and then obtains the corresponding posterior probability table according to the identifier, where the posterior probability table includes distribution probability conditions of the MS in the cells in the service state. After the first processing module 11 obtains the posterior probability table for paging, the paging module 12 is responsible for paging the target MS according to the posterior probability table. Specifically, the distribution probabilities corresponding to all the cells included in the limited posterior probability table are sorted in sequence, and then the cell with the high distribution probability is preferably selected for paging, that is, the paging is performed in a descending order of the distribution probabilities.

In this embodiment, the posterior probability table may be merely a table, where the distribution probabilities of the target MS in the cells at all time in the service state are

TABLE 4

| Bit location | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| corresponding cell | Not used | Not used | Not used | Not used | Not used | Not used | C19 | C18 | C17 | C16 | C15 | C14 | C13 | C12 | C11 | C10 |
| Whether to deliver a paging instruction | 0 | 0 | 0 | 0 | 0 | 0 | 0 | 1 | 1 | 1 | 0 | 0 | 0 | 0 | 0 | 0 | recorded. Definitely, a plurality of posterior probability tables may also be established with the time segment as a unit, and each posterior probability table reflects the distribution probabilities in a time segment. In this way, the paging becomes more accurate. When many posterior probability tables are maintained, the first processing module 11 is further configured to select the corresponding posterior probability table according to the identifier of the target MS included in the service call request and the time of receiving the service call request. After receiving the service call request, the first processing module 11 first determines the receiving time, and then selects the corresponding posterior probability table for paging according to the time and the identifier.

Through the mobile call center device provided in this embodiment, the paging is performed on the basis of the distribution probabilities of the user in the cells in the service state. In this way, the paging process is simpler and more flexible, and the application scenario is wider, thereby saving the air interface resources while ensuring the paging efficiency.

Figure 4:
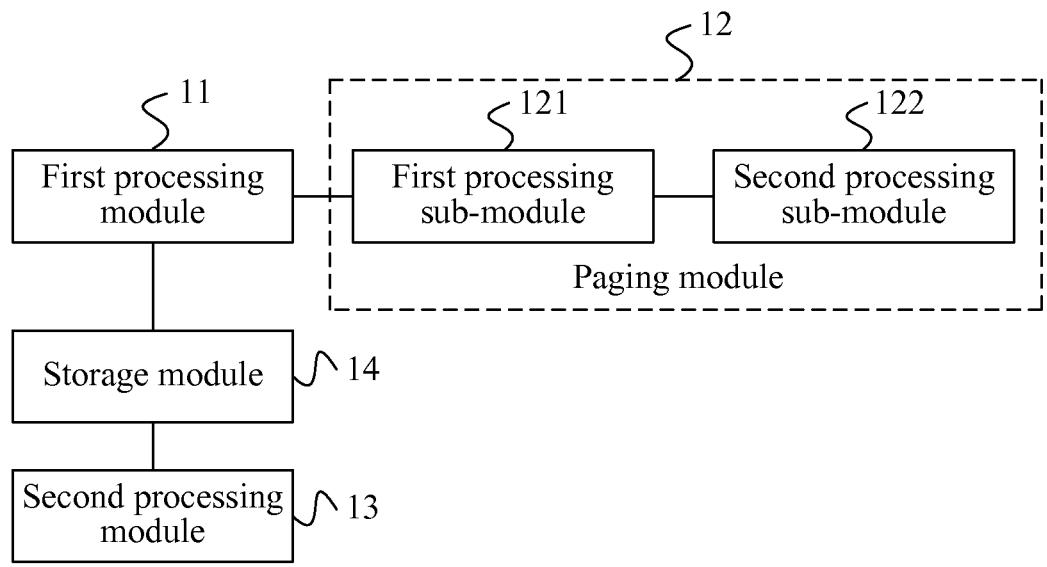
FIG. 4 is a schematic structure diagram of a mobile call center device according to another embodiment of the present invention.

FIG. 4 is a schematic structure diagram of a mobile call center device according to another embodiment of the present invention. As shown in FIG. 4, the mobile call center device includes a first processing module 11 and a paging module 12, where the paging module 12 includes a first processing sub-module 121 and a second processing sub-module 122. The first processing sub-module 121 is configured to classify the cells in the posterior probability table into a plurality of paging sets with the same number as the maximum paging times, where the paging set is obtained in a descending order of the distribution probabilities, and the maximum paging times is obtained according to a maximum allowable call delay of a service call request and each paging time; and the second processing sub-module 122 is configured to page the target MS in a descending order of the distribution probabilities with a paging set as a unit.

Specifically, the first processing sub-module 121 classifies the multiple cells into several paging sets, where the number of the paging sets is the same as the maximum paging times, and preferably classifies the cell with the high distribution probability into the paging set with the high priority. The paging set has a priority. The second processing sub-module 122 in the mobile call center device performs the paging in a descending order of the priorities. After the first processing sub-module 121 finishes classifying the paging sets, the second processing sub-module 122 separately pages in a descending order of the priorities of the paging sets within the maximum allowable call delay, pages all the cells in one paging set at each time, and first pages the paging sets including a high distribution probability. If the paging is successful, the paging is stopped; if the paging fails, the paging sets with the medium distribution probability is paged; and finally the paging sets with the low distribution probability is paged. In this way, not only it is ensured to successfully page within the maximum allowable call delay as much as possible, but also the air interface resources are saved.

In this embodiment, the first processing sub-module 121 may classify the paging sets using average division or according to a preset division rule, and the division is completed by a first processing unit and/or a second processing unit included in the first processing sub-module 121, where the first processing unit is configured to evenly classify the cells in the posterior probability table into several paging sets with the same number as the maximum paging times in a descending order of the distribution probabilities.

The second processing unit is configured to classify the cells in the posterior probability table into the paging sets according to a preset rule, and the preset rule includes:

The paging set including the minimum number of cells is selected, so that $P_1 > P_{t1}$, $P_2 > P_{t2}$, ..., $P_K > P_{tK}$, where $P_k$ represents a sum of the distribution probabilities corresponding to the cells included in the first paging set to the kth paging set in the K paging sets; $P_{tk}$ represents a paging success probability threshold in a $k_{th}$ time; k and K are positive integers; $0 < k \leq K$, and K represents the maximum paging times.

The first processing unit and the second processing unit classify the cells in the posterior probability table into several paging sets according to different classifying principles, and the MSC optimizes the paging with the paging set as a unit. For a specific classifying principle, reference is made to the above method embodiment, and the details are not described in detail here again. The involved posterior probability table may be generated by the second processing module 13 included in the MSC. Specifically, the second processing module 13 makes statistics of the distribution information of the target MS in the cells in a service state in a period, and obtains the distribution probabilities of the target MS in the cells of the LA where the target MS is located in the service state according to a sum of the distribution information of the target MS in each cell and the distribution information in all the cells in the LA, and then establishes the posterior probability table according to the cell identifier and the corresponding distribution probability. The generated posterior probability table may be maintained by a VLR or an HLR, and may also be maintained by the MSC. For example, the posterior probability table is stored in a storage module 14 in the MSC for maintenance.

Through the mobile call center device provided in this embodiment, the paging is performed on the basis of the distribution probabilities of the user in the cells in the service state. In this way, the paging process is simpler and more flexible, and the application scenario is wider, thereby saving the air interface resources while ensuring the paging efficiency.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from scope of the present invention.

What is claimed is:

1. A mobile station paging method, comprising:
   receiving a service call request and selecting a corresponding posterior probability table according to an identifier of a target mobile station included in the service call request, wherein the posterior probability table comprises distribution probability of the target mobile station in each cell of a location area where the target mobile station is located in a service state; and
   selecting a cell to page the target mobile station according to the distribution probability by classifying each cell in the posterior probability table into one of a plurality of paging sets by selecting a paging set comprising the minimum number of cells, where $P_1 > P_{t1}$, $P_2 > P_{t2}$, ..., $P_K > P_{tK}$, where $P_k$ represents a sum of the distribution probabilities corresponding to the cells included in the first paging set to the kth paging set in the K paging sets, $P_{tk}$ represents a paging success probability threshold in a kth time, k and K are positive integers, $0<k\leq K$, and K represents the maximum paging times, wherein the paging sets are obtained in a descending order of the distribution probabilities and the maximum paging times is obtained according to the maximum allowable call delay of the service call request and each paging time; and paging the target mobile station in a descending order of the distribution probabilities with the paging set as a unit.

2. The mobile station paging method according to claim 1, wherein the classifying each cell in the posterior probability table into the plurality of paging sets with the same number as the maximum paging times comprises:

evenly classifying each cell in the posterior probability table into the paging sets.

3. The mobile station paging method according to claim 1, wherein the selecting the corresponding posterior probability table according to the identifier of the target mobile station included in the service call request comprises:

selecting the corresponding posterior probability table according to the identifier of the target mobile station included in the service call request and the time of receiving the service call request.

4. The mobile station paging method according to claim 1, wherein before the receiving the service call request, the method further comprises:

making statistics of distribution information of the target mobile station in each cell in the service state in a period; and obtaining the distribution probabilities of the target mobile station in each cell of the location area where the target mobile station is located in the service state according to the distribution information of the target mobile station in each cell and a sum of the distribution information corresponding to all the cells in the location area.

5. The mobile station paging method according to claim 4, wherein the distribution information comprises times of responding calls by the target mobile station in each cell, or a sum of times of initiating calls and the times of responding the calls, or a service duration.

6. The MS mobile station paging method according to claim 4, wherein the method further comprises:

dividing the period into at least one time segment, and establishing posterior probability tables corresponding to the at least one time segment.

7. A mobile call center device, comprising:

a first processing module, configured to receive a service call request and to select a corresponding posterior probability table according to an identifier of a target mobile station included in the service call request, wherein the posterior probability table comprises distribution probability of the target mobile station in each cell of a location area where the target mobile station is located in a service state; and a paging module, configured to select a cell to page the target mobile station according to the distribution probability, the paging module comprising:

a first processing sub-module, configured to classify each cell in the posterior probability table into one of plurality of paging sets by selecting a paging set comprising the minimum number of cells, where $P_1 > P_{t1}$, $P_2 > P_{t2}, \ldots, P_K > P_{tK}$, where $P_k$ represents a sum of the distribution probabilities corresponding to the cells included in the first paging set to the kth paging set in the K paging sets, $P_{tk}$ represents a paging success probability threshold in a kth kth time, k and K are positive integers, $0<k\leq K$, and K represents the maximum paging times; wherein the paging sets are obtained in a descending order of the distribution probabilities and the maximum paging times is obtained according to the maximum allowable call delay of the service call request and each paging time; and a second processing sub-module, configured to page the target mobile station in a descending order of the distribution probabilities with the paging set as a unit.

8. The mobile call center device according to claim 7, wherein the first processing module is further configured to select the corresponding posterior probability table according to the identifier of the target mobile station included in the service call request and the time of receiving the service call request.

9. The mobile call center device according to claim 7, further comprising:

a second processing module, configured to make statistics of distribution information of the target mobile station in each cell in a service state in a period, and obtain the distribution probabilities of the target mobile station in each cell of the location area where the target mobile station is located in the service state according to the distribution information of the target mobile station in each cell and a sum of the distribution information corresponding to all the cells in the location area.

10. The mobile call center device according to claim 7, wherein the second processing module is further configured to establish the posterior probability table according to the cell identifier and the corresponding distribution probability.

11. The mobile call center device according to claim 7, further comprising:

a storage module, configured to store the posterior probability table.

* * * * *